United States Patent Office 2,702,985
Patented Mar. 1, 1955

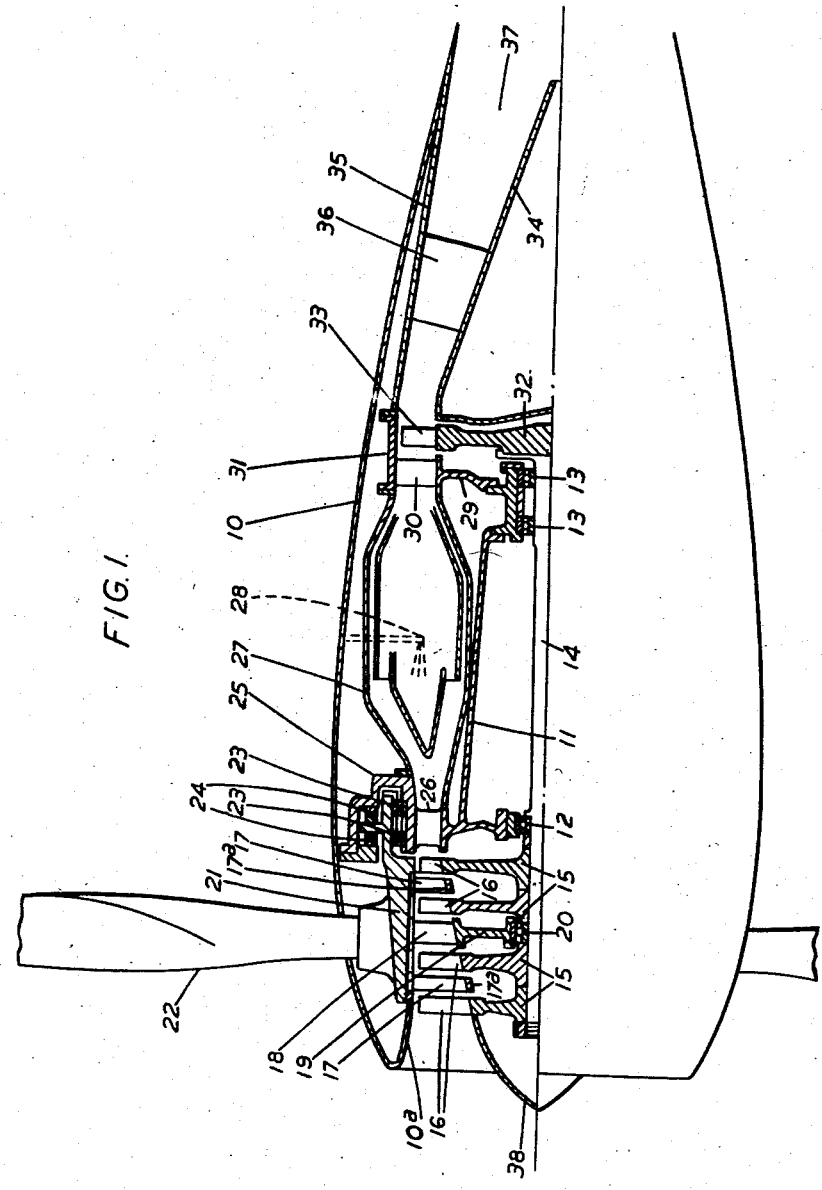

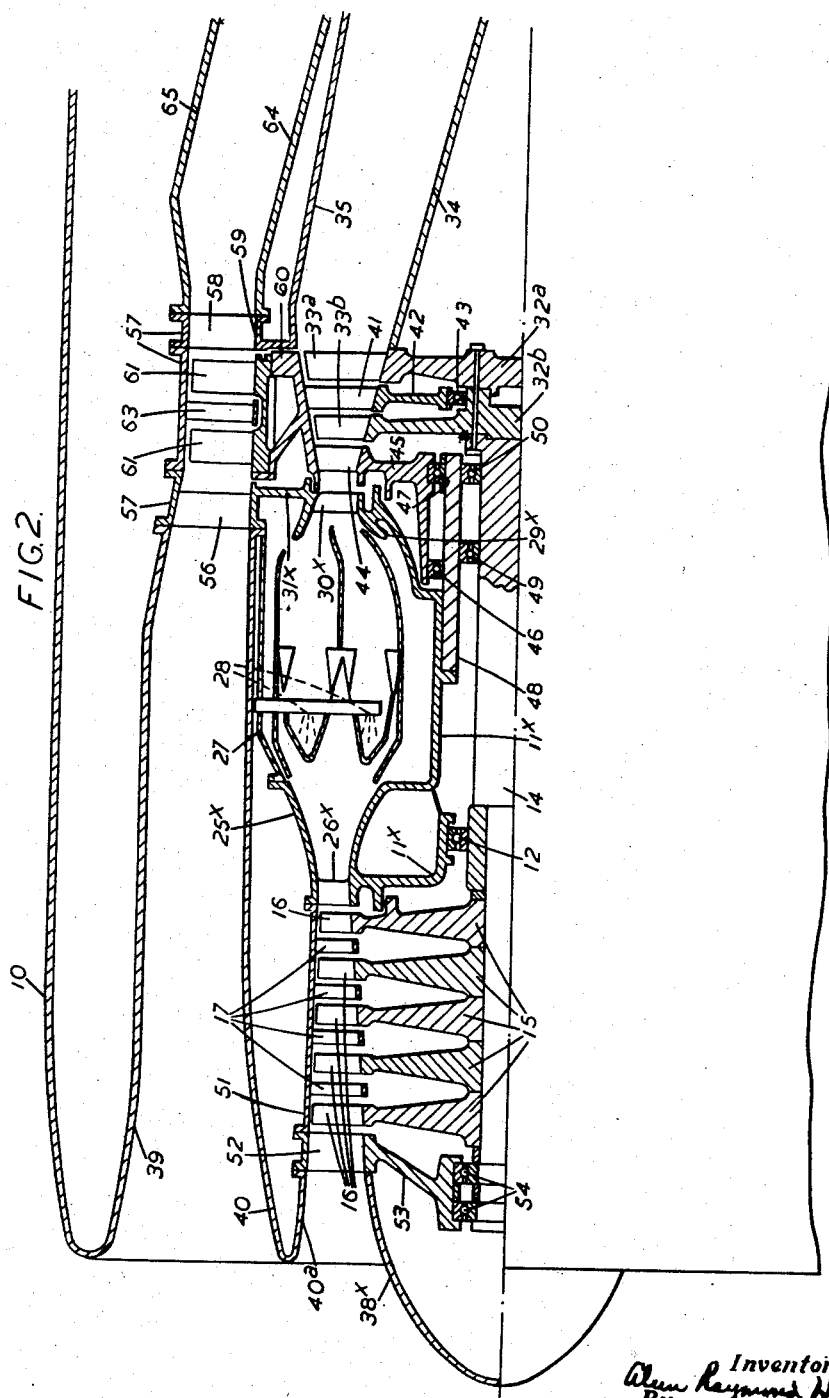

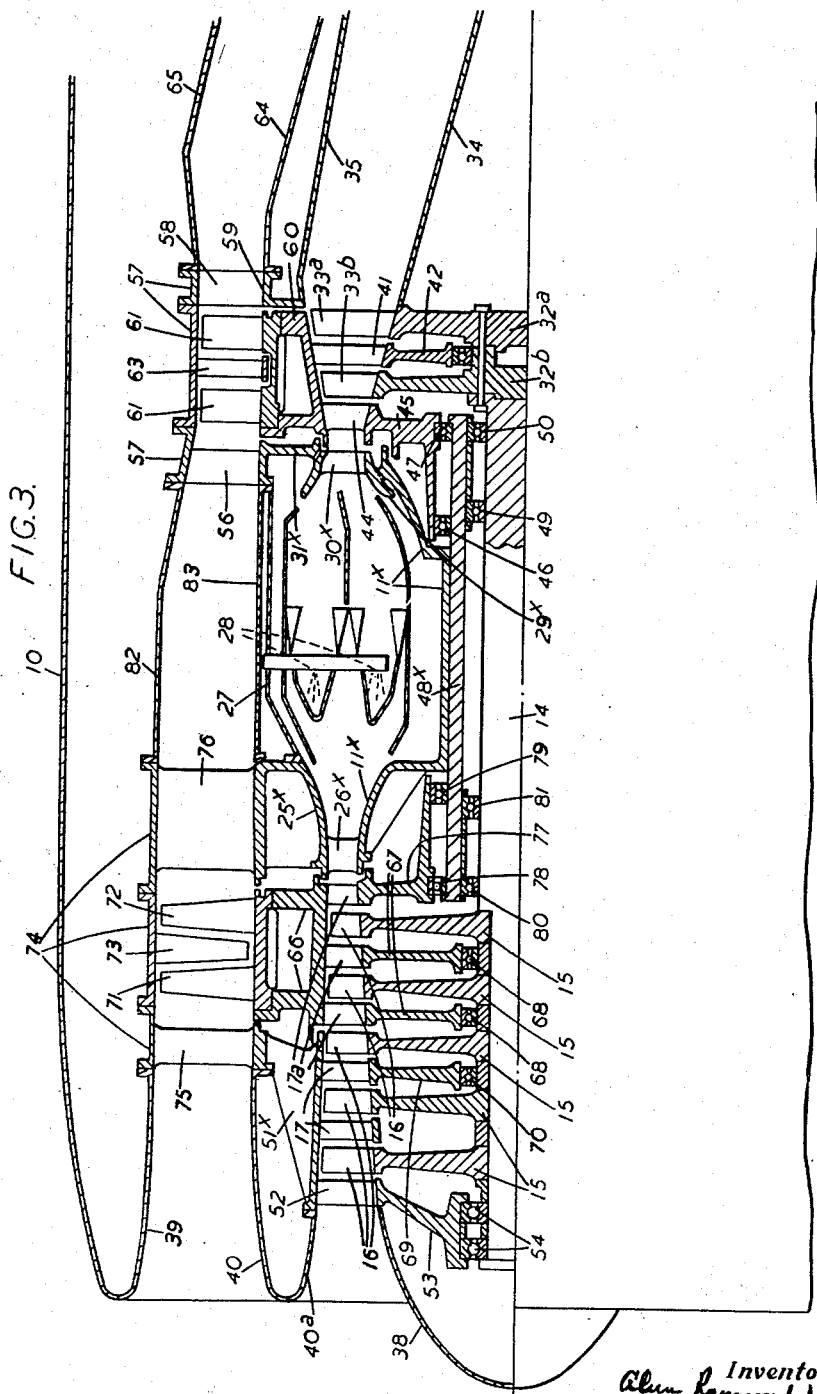

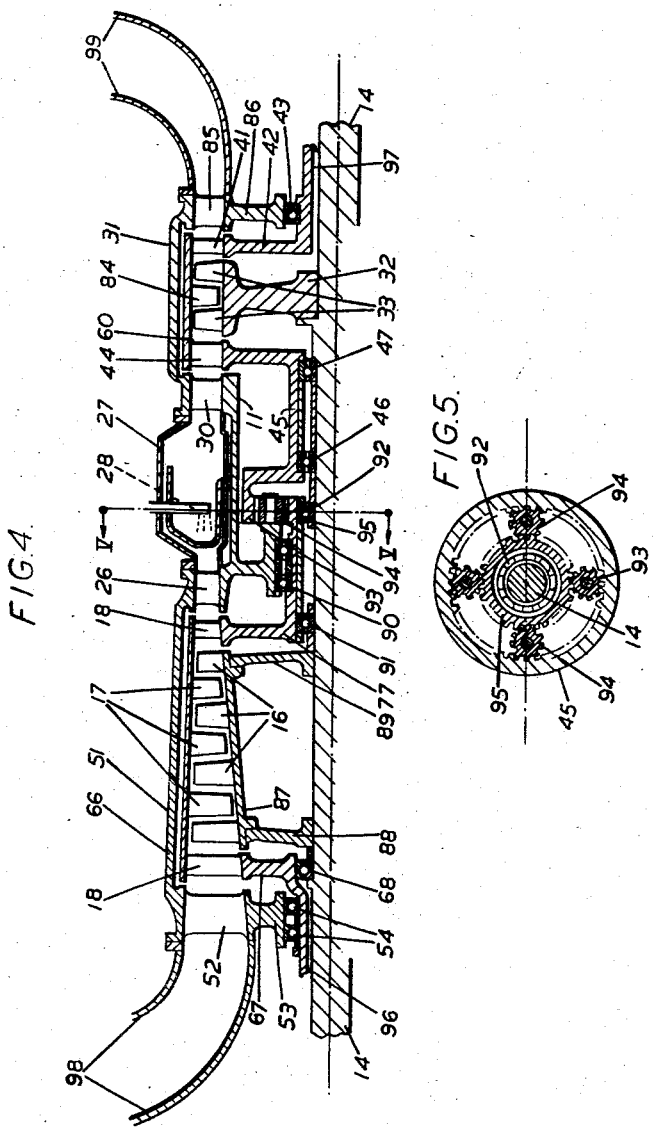

2,702,985

GAS TURBINE POWER PLANT WITH POWER TAKE-OFF FROM ROTATABLE GUIDE BLADING

Alun Raymond Howell, Cove, Farnborough, England, assignor to Power Jets (Research and Development) Limited, London, England, a British company Continuation of application Serial No. 575,538, January 31, 1945. This application May 26, 1952, Serial No. 289,933

Claims priority, application Great Britain January 31, 1944

2 Claims. (Cl. 60—35.6)

This invention relates to gas turbine power plant of the kind including a compressor delivering air to a combustion system which in turn supplies a turbine, the compressor and turbine having rotors drivingly connected by being secured to a common shaft. The present application is a continuation of application Serial No. 575,538, filed January 31, 1945, now abandoned.

The invention is primarily concerned with the problem of taking off power from such a plant at speeds lower than that of the main compressor-driving turbine rotor. The rotational speed of this rotor is in general much higher than that appropriate for driving, for example, bladed rotary propulsive means such as airscrews or ducted fans, and so to drive them from this rotor or from the rotor of an auxiliary exhaust turbine will necessitate the use of reduction gearing of high ratio. A similar problem is met with in using gas turbine power plant to drive rotary machinery of any kind, for example, for land traction, marine or power station use, since in all these cases, the appropriate speed of the driven machinery is low compared with that of the turbine rotor.

Accordingly, in the present invention, rotatable guide blading is provided in the compressor or both the compressor and the turbine, from which power is taken at relatively low speeds.

The compressor guide blading will rotate in the same direction, and the turbine guide blading will rotate in the opposite direction to the coupled rotors of the compressor and turbine.

A further feature of the invention relates to the provision of improved bearing arrangements for the rotary guide blading and for the rotors, giving low bearing speeds but good location properties for clearances and balancing. It is necessary that the clearances between the two rotating members should be as small as possible to ensure low aerodynamic losses. This could be achieved by placing the bearings for the guide blade stages on the shaft connecting the coupled rotors, but this might give rise to difficulties, as it would often involve too high bearing loads and also, in the case of the turbine where the guide blades and rotor rotate in opposite directions, too high relative rotational speeds.

According to a feature of the invention, therefore, the plant includes hollow stationary structure between the compressor and turbine, which structure affords externally a bearing for said guide blading and internally a bearing for the shaft.

How the invention may be performed will be understood from the following description, given by way of example and having reference to the accompanying drawings of a number of embodiments.

In the drawings:

Figure 1 shows in half axial section an internal combustion turbine power plant for aircraft, including jet propulsion means and a tractor airscrew propeller;

Figure 2 is a view similar to Figure 1 of another embodiment of the invention in an aircraft power plant in which a ducted fan is used to augment the thrust of exhaust jet reaction means, instead of a propeller;

Figure 3 is a similar view of a modification of the embodiment of Figure 2 having two thrust augmenting fan units operating in series in a common duct;

Figure 4 is a similar view of an internal combustion turbine power plant adapted to deliver its whole output in the form of shaft power; and Figure 5 is a section on the line V—V in Figure 4.

In the embodiment of Figure 1, the power plant is enclosed in an aircraft nacelle whose outer skin is shown at 10. The power plant comprises a rigid casing or "backbone" 11, a shaft 14, compressor rotor 15, an enclosing compressor casing 21, a series of combustion chambers 27, a turbine casing 31, a turbine rotor 32, an annular exhaust duct 34, 35 and a jet reaction nozzle 37.

The casing 11 supports shaft 14 in bearings 12, 13. To its rear end is secured a diaphragm member 29 connected to the turbine casing 31 as described below. The compressor rotor comprises a number of wheels 15 keyed on the shaft 14 and each having a row of compressor rotor blades 16, which co-operate with rows of guide blades 17, 18 of the compressor. The latter are secured to the inside of the casing 21, and the inner extremities of the blades of the intermediate row 18 are secured to the flange on an intermediate diaphragm 19 which is rotatably supported on the shaft 14 by a bearing 20, which is in the nature of a steady bearing. For its main bearing support, the rear end of the casing 21 is carried by radial bearings 23 mounted in a housing 25 which also houses thrust bearings 24, which abut on a thrust collar formed on the casing 21.

The housing 25 is connected to the casing 11 by radial webs 26 which also serve as guide vanes at the exit of the compressor annular duct, bounded by the casing 21 and the rims of wheels 15 and of the diaphragm 19; to complete the inner boundary, the inner ends of the guide vanes 17 are secured to shroud rings 17a.

The air, after being compressed in the compressor duct and after passing the webs 26 is delivered to a number of circumferentially spaced combustion chambers 27, containing fuel injection nozzles 28, the expanding products of combustion passing into a turbine annular duct defined by the outer turbine casing 31 and the inner diaphragm member 29. The last two named members are connected by radial webs 30, which serve also as entry guide vanes to the turbine. The latter comprises a turbine rotor wheel 32 keyed on the shaft 14 and carrying a single row of turbine rotor blading 33.

The turbine exhaust passes into an annular exhaust duct bounded by an outer duct wall 35 and an inner duct wall, constituted by the surface of a conical boss 34, supported from the outer duct wall by radial webs 36. The annular exhaust duct terminates in a jet reaction nozzle 37.

It will be seen that the compressor guide blades are not stationary but are mounted for rotation coaxially with the compressor rotor. When the engine is in operation the compressor casing 21 will be rotated in the same direction as the compressor rotor 15, and will deliver power.

In this example, the power delivered by the compressor casing 21 is used for driving a tractor propeller 22, which is mounted directly on the rotary casing 21. The latter member also supports an annular spinner 10a, of which the outer portion continues the profile of the nacelle skin 10 and the inner portion defines the outer boundary of the annular intake to the compressor whose inner boundary is defined by a boss shaped spinner shell 38 mounted on the forward-most of the compressor rotor wheels 15.

The embodiment shown in Figure 2 resembles that shown in Figure 1, corresponding parts being indicated by the same reference numbers, the suffix "x" being added where the corresponding parts have any substantial difference. In this instance, the guide blading of the compressor is stationary, the rows of blades 17 being secured to the inner face of a stator casing 51, whose forward end is connected by means of radial webs 52 with a diaphragm 53, which supports shaft 14 in bearings 54. Webs 52 serve also as entry guide vanes in the compressor annular duct.

The compressor rotor consists of a number of wheels 15 keyed on to shaft 14, and each carrying a row of rotor blades 16, co-operating with the guide blades 17.

The rear end of the compressor stator casing 51 is continued by a casing ring 25x connected by radial webs 26x (serving also as exit guide vanes for the compressor)

to the casing or "backbone" 11x, which includes in this instance a forward extension in the form of a webbed diaphragm supporting the bearing 12 in which the shaft 14 is supported. The air from the compressor passes into a number of circumferentially spaced combustion chambers 27 which are of duplex form with flame tubes dividing them longitudinally into two sections in which duplex fuel injection nozzles 28 are mounted. This feature, however, forms no part of the present invention and will not be further described.

The annular entry of the turbine duct into which the expanding gases pass from the combustion chambers 27 is constituted by an outer member 31x, radial webs 30x and an inner ring member 29x which is located by the rear end of the casing 11x.

In this example the turbine casing is not stationary, being rotatably mounted; it comprises an outer casing member 60 carrying inwardly projecting rows of guide blades 41, 44, whose inner extremities are secured respectively to the rims of diaphragms 42 and 45, the latter including an integral axially extending sleeve forming an extended bearing housing. In this instance the turbine rotor comprises two turbine wheels 32a, 32b, respectively carrying rows 33a, 33b, of turbine rotor blading, both wheels being secured by through-bolts to the end of shaft 14.

Between the rotor wheels 32a, 32b is mounted a bearing 43, rotatably supporting the diaphragm 42. The bearing 43 is in the nature of a steady bearing, the main bearing support of the rotary casing 60 being provided by a bearing sleeve 48, supported in the casing 11x and carrying external bearings 46, 47, on which the sleeve portion of the diaphragm 45 is rotatably supported; the sleeve 48 also supports by means of internal bearings 49, 50, the rear end of the shaft 14. This arrangement substantially reduces the rubbing speeds of the several bearings as compared with an arrangement having a single row of bearings directly interposed between the main shaft 14 and the rotary sleeve extension of diaphragm 45, and provides for correct location of the several parts for clearances and balancing. Preferably the bearing sleeve 48 is not formed integral with the casing 11x but is fitted and keyed thereinto.

As before, the exhaust from the turbine is delivered to an exhaust duct defined by members 34, 35, which terminates in a jet reaction nozzle (not shown).

The thrust of this nozzle in this example is augmented by an airstream delivered by an auxiliary ducted fan, directly driven by the rotary turbine casing 60. This auxiliary ducted fan is constituted as follows: the rotary turbine casing 60 of the turbine comprises, in addition to the inner casing ring defining the outer boundary of the turbine duct, an outer casing ring defining part of the inner boundary of an exterior annular duct, in which the ducted fan operates. This inner boundary is continued on either side of the casing 60 by a fixed ring 59 at the rear and a fixed ring element forming a part of the fixed turbine casing member 31x at the front. The outer boundary of the fan duct is constituted by a built up casing 57, connected at front and rear to the members 31x and 59 by radial webs 56, 58 respectively, which also act as entry and exit guide vanes to the ducted fan. The latter comprises two rows of rotor blading 61, secured to the turbine casing 60, and a single row of stator blades 63 secured to the outer casing member 57.

As shown in the drawing, the inner extremities of the stator blades 63 are interconnected by a shroud ring which lies in a groove formed in the outer element of the turbine casing 60. This particular feature, however, is not essential.

The outer and inner boundaries of the auxiliary ducted fan are continued at front and rear respectively by fairings 39, 40 and 65, 64. The duct defined by the latter members discharges rearwardly by means of an annular jet nozzle surrounding the jet nozzle for the exhaust gases of the turbine, and the leading ends of the fairings 39, 40, define an air intake for the auxiliary fan duct co-planar with the air intake of the compressor defined by a fairing 40a, continuous with fairing 49, and a boss shaped fairing 38x mounted on the forward diaphragm 53.

The outer boundary fairing 39 of the annular auxiliary fan duct is continuous at the intake with the outer skin 10 of the nacelle.

Figure 3 illustrates a modification of the embodiment of Figure 2 in which an additional auxiliary ducted fan, operating in the same duct as, and in series with, the turbine driven auxiliary fan described with reference to Figure 2, is driven by rotary compressor guide blades. The outer casing of the compressor is divided into two sections, a low pressure and high pressure section, of which the former has stationary guide blades 17, and the latter moving guide blades 17a. The blades 17 of the low pressure section of the compressor casing are secured to the inner face of a fixed casing member 51x, which also includes integrally formed radial webs and a ring-shaped element defining a part of the inner boundary of the auxiliary fan duct. This member 51x is connected to the forward diaphragm 53 by radial webs 52 as in Figure 2.

The inner ends of the rear-most row of stationary guide blades 17 (secured to the member 51x) are secured to the rim of a diaphragm 69, supported on the shaft 14 by means of a bearing 70, thereby providing support for the rear end of the casing member 51x.

The casing member 25x at the rear end of the compressor (see also Figure 2) is in this instance an integral box-like structure comprising inner and outer ring shaped walls and radial stiffening webs. The inner wall constitutes the outer boundary of the transfer duct leading from the compressor to the circumferentially spaced combustion chambers 27, and the outer wall constitutes a part of the inner boundary of the annular auxiliary fan duct.

Between the members 51x and 25x is situated the rotary section of the compressor casing. This comprises wheels 67, rotatably supported on the shaft 14 by bearings 68, diaphragm 77 having an axially extending sleeve, rows of rotary guide blading 17a and a rotary casing member 66 of box section.

The rims of wheels 67 and of the sleeved diaphragm 77 are connected by the guide blade rows 17a to the inner face of the box section casing member 66, whose outer face carries two rows of ducted fan blading 71, 72, constituting the rotor of the additional auxiliary ducted fan. Between the rows 71, 72 of rotor blading is situated a row 73 of stator blading projecting inwardly from an outer casing shell 74 constituting a part of the outer boundary of the annular auxiliary fan duct. The outer casing shell 74 is structurally connected to the casing members 51x, 25x respectively by radial webs 75, 76, which also serve as entry and exit guide vanes for the auxiliary fan 71, 72, 73.

The bearing sleeve 48 of Figure 2 is in the embodiment of Figure 3 replaced by an extended bearing sleeve 48x, the forward extension of which carries external bearings 78, 79, rotatably supporting the sleeve of the diaphragm 77. It also carries internal bearings 80, 81, in which the shaft 14 is rotatably supported. As explained with reference to Figure 2, this arrangement reduces the rubbing speed of the bearings supporting the rotary guide blading of the compressor.

Since in this example the fairings 39, 40, defining the intake of the auxiliary fan duct terminate where they join the members 74, 51x, respectively, additional fairings 82, 83, are provided defining the boundaries of the auxiliary fan duct between the members 74, 57 and 25x, 31x respectively.

In other respects the arrangement of parts is similar to that shown in Figure 2 and described with reference thereto, and the reference figures in Figure 3, not hitherto mentioned, have their counterparts in Figure 2 in which they indicate corresponding parts.

The embodiment shown in Figures 4 and 5 is a modification of the embodiment of Figure 3 adapted to deliver the whole power output of the plant as shaft power.

The fixed structure of the plant consists of three parts, a compressor casing 51, a turbine casing 31 and an intermediate casing or "backbone" member 11. The outer (inlet) end of casing 51 is supported by a diaphragm 53, being connected thereto by radial webs 52, and the outer (outlet) end of casing 31 is supported by a diaphragm 86, being connected thereto by radial webs 85. Radial webs 26, 30 respectively connect the "backbone" member 11 to the inner ends of the compressor casing 51 and turbine casing 31.

Between the fixed casings 51, 31 are situated a number of circumferentially spaced combustion chambers 27, containing fuel injectors 28.

The central shaft 14 has keyed thereon diaphragms 88 and 89 supporting a compressor rotor drum 87 carrying a number of rows of compressor rotor blades 16. Shaft 14 also has keyed thereon a turbine rotor wheel 32 carrying two rows of turbine rotor blades 33.

The guide blading of the compressor is entirely rotary and consists of rows of inwardly extending compressor guide blades 17, 18 carried by rotary shell 66, and co-operating with the compressor rotor blades 16. The shell 66 is carried at its outer (inlet) end on a supporting diaphragm 67 and at its inner end on a diaphragm 77 which includes an axially extending sleeve, being connected thereto by the first and last rows of guide blades 18.

The diaphragm 67 supports shaft 14 in bearing 68 and is itself integrally formed with or secured to a hollow power output shaft 96 coaxial with shaft 14 and supported in turn by the diaphragm 53 in bearings 54. Bearings 90 are also interposed between the sleeve of diaphragm 77 and the casing member 11.

The turbine guide blading is also entirely rotary and consists of a row of turbine guide blades 84, carried in a shell 60 and lying between the two rows of turbine rotor blades 33, and rows of inlet and outlet guide blades 44, 41. The shell 60 is connected by means of these rows of guide blades 44, 41 respectively to a sleeve 45 having two integral diaphragms and to a diaphragm 42. This diaphragm 42 is integral with or secured to a hollow power output shaft 97 supported by diaphragm 86 in a bearing 43. The sleeve member 45 is supported on shaft 14 by bearings 46, 47.

The rotary guide blades of the compressor and turbine are geared together by means of a train of epicyclic spur gearing, comprising a sun pinion 95 formed on one end of the sleeve part of diaphragm 77, a number of planet pinions 94 rotatably supported by an inward extension of casing member 11, and an internal annular gear 93 formed on an extension of the inner diaphragm part of the sleeve member 45.

Since the planetary cage constituted by the member 11 is stationary, the turbine and compressor guide blades are compelled to counter-rotate and their rotational speeds must bear a constant ratio to one another.

In the arrangement illustrated in which the sun pinion is carried by the compressor guide blading and the annular gear by the turbine guide blading, the latter is compelled to rotate at lower speed than the compressor guide blading and hence the speed of shaft 97 is less than that of shaft 96. The speeds of these shafts can be made to approach very nearly to one another by reducing the diameter of the planet pinions 94 as much as possible. This is desirable if it is required to obtain as nearly as possible equal power outputs from the shafts 96, 97 since the power outputs will be proportional to the rotational speeds.

The power plant shown in Figures 4 and 5 is completed by an air intake duct 98 leading to the compressor entry and an exhaust duct 99 carrying the exhaust gases away from the turbine exit.

As in this example, the whole power output is intended to be delivered as shaft power to the shaft 96, 97, no provision is made for obtaining jet reaction thrust from the exhaust of the turbine. The turbine is intended to utilise the whole of the expansion of the gases issuing from the combustion chambers down to the practical limit of final pressure.

The power delivered by shafts 96, 97 may be applied to any form of external load according to the duty for which the power plant is installed. Thus the plant may be used as a stationary engine, or for locomotive or marine or the like use, or for installation in an aircraft to drive an airscrew.

I claim:

1. A jet propulsion gas turbine power plant comprising a multistage axial flow compressor assembly, which includes a compressor rotor, a plurality of rows of rotor blades carried thereby, a stationary casing enclosing the compressor rotor for part of its length at the inlet end, a plurality of rows of inwardly extending compressor guide blades carried thereby, a second casing enclosing the compressor rotor for the remainder of its length, and a plurality of rows of inwardly extending compressor guide blades carried thereby; a multi-stage axial flow turbine assembly coaxial with and axially spaced from the compressor assembly, which includes a turbine rotor, a plurality of rows of rotor blades carried thereby, an enclosing casing, and a plurality of rows of inwardly extending turbine guide blades carried thereby; a shaft coupling the compressor and turbine rotors; a combustion system lying between the compressor and turbine assemblies and annularly surrounding the shaft; a propulsive jet duct into which the turbine exhausts; a supplementary thrust augmentor duct annularly surrounding the plant; a plurality of rows of outwardly extending thrust augmenting rotor blades carried by said second casing of the compressor, and operating in said supplementary duct; and a plurality of rows of outwardly extending thrust augmenting rotor blades carried by said enclosing casing of the turbine and operating in said supplementary duct; said second casing of the compressor and the casing of the turbine being mounted for rotation independently of each other and of the compressor and turbine rotors.

2. A gas turbine power plant comprising an axial flow compressor assembly including a rotor, a row of compressor rotor blades carried thereby, and a row of compressor guide blades co-operating with the compressor rotor blades; an axial flow turbine assembly including a rotor coaxial with and axially spaced from said compressor rotor, a row of turbine rotor blades carried thereby, and a row of turbine guide blades co-operating with the turbine rotor blades; a shaft coupling said rotors; a combustion system lying between the compressor and turbine assemblies and annularly surrounding said shaft; bladed rotary propulsion means drivingly connected to said compressor guide blades; further bladed rotary propulsion means drivingly connected to said turbine guide blades; said rows of compressor and turbine guide blades and the bladed rotary propulsion means connected thereto being mounted for rotation mechanically independently of each other and of said compressor and turbine rotors.

References Cited in the file of this patent

UNITED STATES PATENTS

| | | |
|---|---|---|
| 2,416,389 | Heppner et al. | Feb. 25, 1947 |
| 2,428,330 | Heppner | Sept. 30, 1947 |
| 2,430,399 | Heppner | Nov. 4, 1947 |
| 2,478,206 | Redding | Aug. 9, 1949 |
| 2,505,660 | Baumann | Apr. 25, 1950 |